A. WINTON & H. B. ANDERSON.
TWO CYCLE ENGINE.
APPLICATION FILED APR. 2, 1908.
1,046,359.
Patented Dec. 3, 1912.
2 SHEETS—SHEET 2.
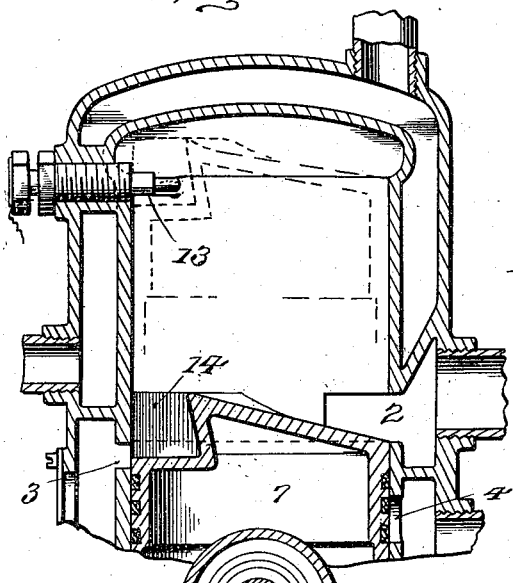
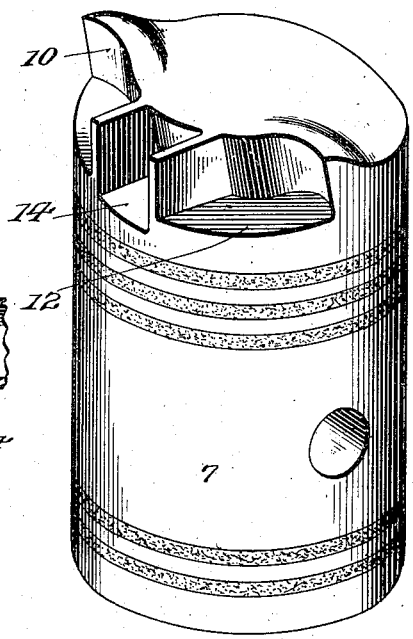
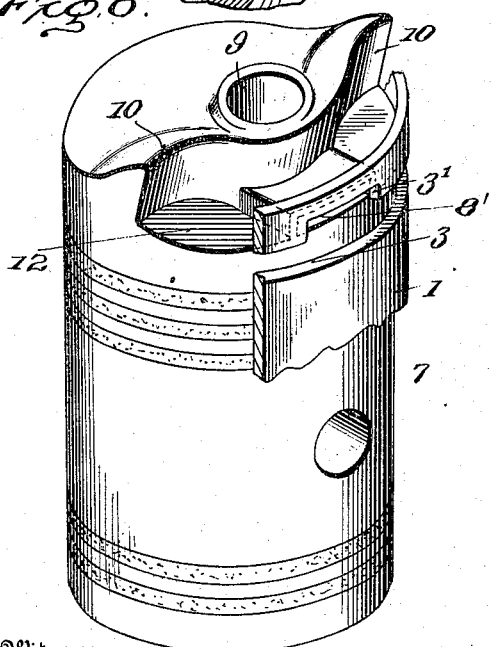
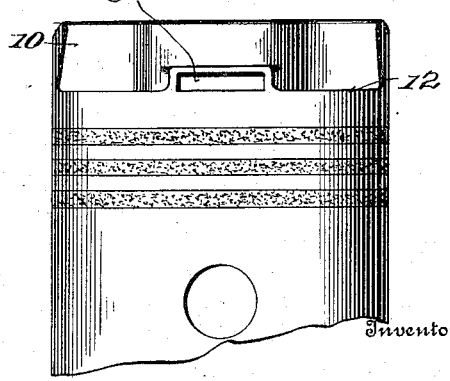

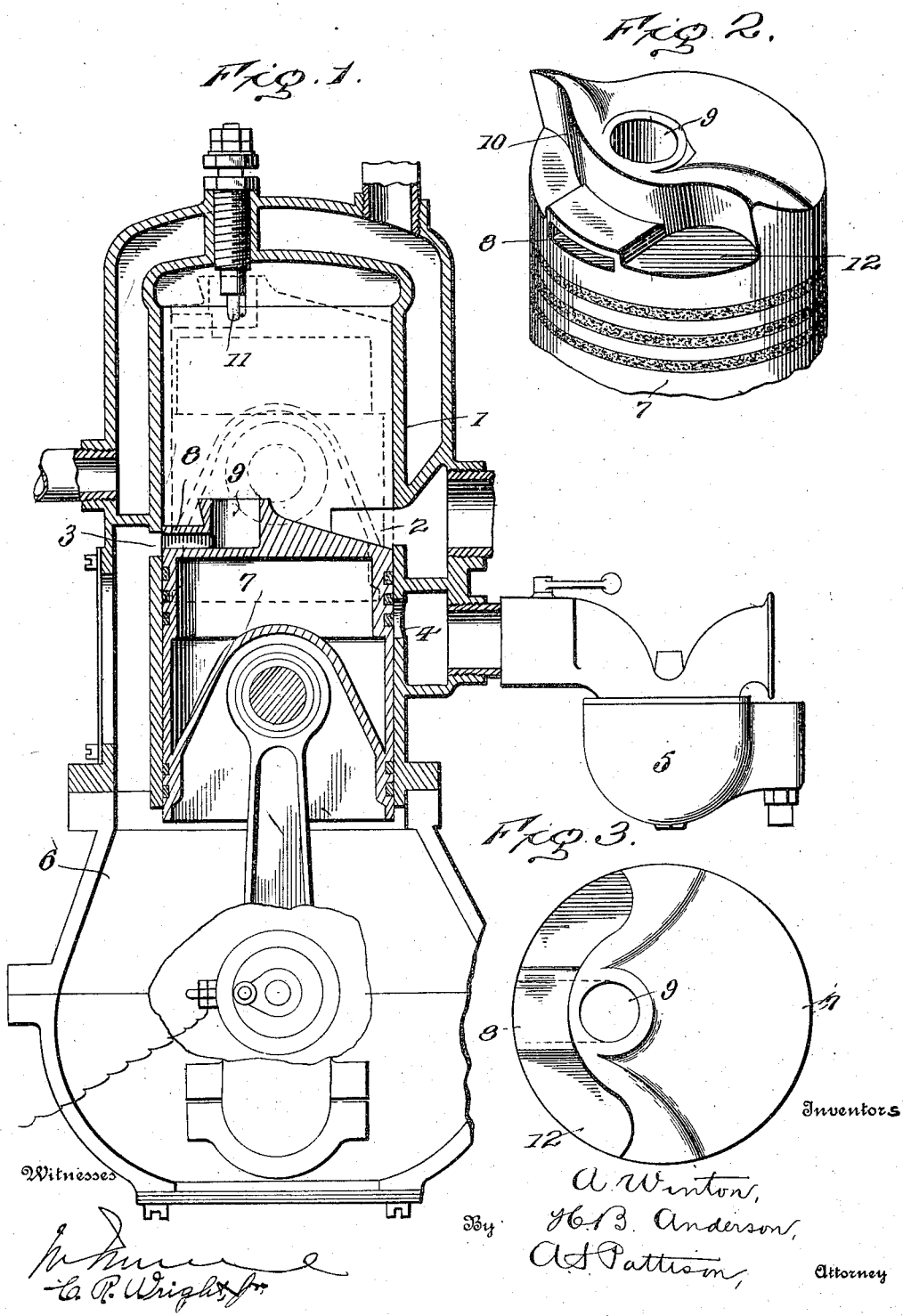

UNITED STATES PATENT OFFICE.

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

TWO-CYCLE ENGINE.

1,046,359.          Specification of Letters Patent.     Patented Dec. 3, 1912.

Application filed April 2, 1908. Serial No. 424,817.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Two-Cycle Engines, of which the following is a specification, reference being had therein to the accompanying drawing.

This invention relates to improvements in two cycle engines, the object of which is to insure an explosion at each stroke of the piston with an exceedingly small charge of fresh explosive mixture, thereby materially increasing the flexibility of the engine with a minimum charge, and effecting economy in the operation thereof by enabling very small charges to be used, without controlling by retarded spark.

It is known to those skilled in this art that in two-cycle engines as new constructed, it is necessary to admit the fresh charge of sufficient volume to displace enough of the burnt gases to cause the fresh charge to reach the spark plug, in order to obtain an explosion, and that because of this necessity the engine is almost wholly controlled by the spark at very low speeds, and that much larger charges for low speeds are necessary than are necessary in a four-cycle type of engine, in which latter type the burnt gases are expelled from the cylinder by the exhaust movement of the piston, so that the fresh charge enters the cylinder when it is practically clear of the burnt gases. Because of this difference, between a four-cycle and the two-cycle of the types known to us, the former is more flexible and more economical in point of fuel consumption at low speeds than the latter.

The present invention enables a two-cycle engine to operate with as little throttle for low speeds, and as economically as a four-cycle, and also enables the motor to be controlled at low speeds by the throttle alone, as in a four-cycle engine, by providing the piston with a small fresh charge pocket which is not coextensive with the cylinder-inlet port, in which the small fresh charge is delivered, and carried by the said pocket directly to or around the spark plug at the time of ignition.

We do not claim herein broadly the idea of providing the piston with a fresh charge pocket, adapted to deliver a fresh charge to the spark plug, for this is made the subject matter of an earlier filed co-pending application, filed January 20th 1908, Serial Number 411,753.

In the accompanying drawings, Figure 1, is a vertical sectional view of an engine having the preferred form of this invention. Fig. 2, is a detached perspective view of an engine piston having the preferred form of the present invention. Fig. 3, is a top plan view of Fig. 2. Fig. 4, is a vertical, sectional view of the cylinder and piston of an engine having a modification of the present improvement. Fig. 5, is a detached, perspective view of the piston of Fig. 4. Fig. 6, is a detached, perspective view of the present improvement, showing another form of the invention. Fig. 7, is a side elevation of the end of the piston shown in Fig. 6.

In carrying out the present invention, as illustrated in Figs. 1 to 3 inclusive, the usual form of cylinder 1 may be used. This cylinder is provided at one side with the usual exhaust-port 2 and at the opposite side with the intake-port 3. Located below the exhaust-port 2 is the carbureter-port 4 which communicates with the carbureter 5 and with the crank-case 6 when the piston is in its outward or upward position. As is well understood by those skilled in this art, in three-port two-cycle engines when the piston 7 moves upward it creates a vacuum, or a tendency to a vacuum, within the crank-case 6, and that when the carbureter-port 4 is uncovered by the piston, the vacuum in the crank-case draws the charge through the carbureter into the crank-case, and that when the piston moves downward the charge in the crank-case is compressed, and this compression forces it into the cylinder 1 as soon as the piston moves to its downward position to permit communication to the cylinder.

Turning now to the present improvement, and referring to the form shown in Figs. 1 to 3, the piston 7 is provided with a pocket which in this form consists of a horizontal portion 8, and a vertical portion 9. The cylinder in take-port 3 is laterally co-extensive with the usual deflector 10 of the piston, so that it will act to deflect the incoming large charge for high speeds or load work in the manner common to two-cycle engines. For nearly-closed throttle and small charges for low speeds, the fresh-charge pocket just referred to receives the small charge before the intake port 3 is wholly in communication with the cylinder, and delivers it directly to the spark-plug 11. It will be observed that the spark-plug is placed directly in line with the vertical opening of the fresh-charge pocket, and is embraced thereby when the piston is in its upward or outward position, as shown in dottted lines, Fig. 1. The spark-plug enters into the pocket sufficiently to permit the necessary spark lead and the control of the speed of the engine by the throttle, the same as in the four-cycle type of engine. It will be understood, that the variation of the spark lead with the spark-plug in the fresh charge pocket, depends upon the depth of the fresh charge pocket and the distance that the spark-plug enters the pocket. The relative depth of the pocket and the entrance of the spark-plug thereinto, as shown in Fig. 1, is found in practice to be approximately all that is necessary to obtain the practical advantages of the present improvement.

In order to insure the entrance of the small charge at very low speeds into the fresh-charge pocket, the relative positions of the cylinder inlet-port 3 and the fresh-charge pocket are such that the latter is brought in communication with the cylinder intake-port 3 in advance of the opening of the whole port, which causes the small charge to be forced directly into the fresh charge pocket, and as this is very small the minimum charge will completely scavenge the pocket of the burnt charge, and the fresh new charge, no matter how small, is delivered by the pocket directly to the spark-plug at the time of ignition, which in actual practice is found to absolutely insure positive explosions of the very smallest charge at every stroke of the piston. This enables the invention to be worked economically at low speeds, and to be controlled by the throttle at low speeds like a four-cycle engine, and to make the engine as flexible at low speeds as the four-cycle. As shown in Figs. 1 to 3, the fresh-charge pocket is brought into communication with the cylinder intake-port 3 in advance of the complete opening of all the port by making the inlet end 8 of the pocket a little lower or farther in than the head 12 of the piston, which latter controls the opening of all of the inlet port 3.

Referring now to Figs. 6 and 7, which show a slight modification, in which the fresh-charge pocket has its horizontal portion 8' in the same plane as the head 12 of the piston (Fig. 7) the piston inlet-port 3 is provided with a cut-out or off-set portion 3' which extends in the direction toward the upper or outer end of the cylinder. This off-set portion 3' is of the same width, or is co-extensive with the intake-portion 8' of the fresh-charge pocket. From this it will be observed that the fresh-charge pocket is brought in communication with the cylinder intake-port in advance of the opening of the whole port, which causes the small charge to enter the fresh-charge pocket in advance of the opening of the whole of the intake-port, and has the same effect and result as the lowering of the fresh-charge pocket as shown in Figs. 1 and 3.

In Figs. 4 and 5 is shown a modification in the construction of the fresh-charge pocket. In this event the fresh-charge pocket is constructed for use in connection with a horizontally-arranged spark-plug 13, and the pocket 14 in this instance is a vertical well 14 which receives the fresh charge and delivers it to the spark-plug, as indicated in Fig. 4. While the pocket 14 is here shown as extending below the head 12 of the piston, it is to be understood that the cylinder intake-port may be provided with an off-set portion, as shown in Fig. 6, and in this instance the lower wall of the pocket 14 can be on a line with the head 12 of the piston.

The construction herein shown and described is an improvement upon the generic invention of our co-pending application, Serial Number 411,753, and we do not therefore claim herein the generic invention, for this is the subject matter of our said co-pending application.

Having thus described this invention, what is claimed and desired to be secured by Letters Patent, is:—

1. In a two cycle engine, the combination with a cylinder having an intake-port, a piston cut-away to uncover the intake-port when the piston is in the charging position, and a fresh charge pocket carried by the piston and positioned to communicate with the intake-port in advance of the uncovering of the intake-port by the movement of the piston, and a sparking device carried by the cylinder in line with and adapted to enter the fresh charge pocket.

2. In a two cycle engine, the combination of a cylinder having an intake-port, a piston controlling the intake-port and having a relatively small fresh charge pocket, the intake-port and fresh charge pocket relatively positioned to cause the fresh charge pocket to register with the intake-port in advance of the opening of all of the intake-port by the movement of the piston, and a sparking device carried by the cylinder in a line with and adapted to enter the fresh charge pocket when the piston is in the firing position.

3. In a two cycle engine, the combination with a cylinder having an intake-port, of a piston controlling the intake-port and having a fresh charge pocket with an inlet-opening at a point between the ends of the piston, whereby it is adapted to register with the intake in advance of the opening of all of the said port, and means for igniting the charge within the fresh charge pocket when the piston is in the firing position.

4. In a two cycle engine, the combination with a cylinder having an intake-port of sufficient size for the maximum fresh charge, of a piston controlling the intake-port and having a relatively small fresh charge pocket, the intake-port and fresh charge pocket relatively positioned to cause the fresh charge-pocket to register with the intake-port in advance of the opening of all of the intake-port for the purpose described, and means for igniting the fresh charge within the said pocket when the piston is in the firing position.

In testimony whereof we affix our signatures in presence of two witnesses.

ALEXANDER WINTON.
HAROLD B. ANDERSON.

Witnesses:
O. F. BAUGHMAN,
G. M. LAVELLE.